United States Patent
Robertson, Jr. et al.

[11] Patent Number: 5,920,178
[45] Date of Patent: Jul. 6, 1999

[54] BATTERY PACK HAVING INTEGRATED CHARGING CIRCUIT AND CHARGING CONNECTOR AND METHOD OF FORMING SAME

[75] Inventors: William H. Robertson, Jr., Plantation; Ellis A. Pinder, Davie; Sam Hosseini, Weston; Michael H. Brannan, Sunrise, all of Fla.

[73] Assignee: Motorola, Inc., Schaumburg, Ill.

[21] Appl. No.: 09/096,394

[22] Filed: Jun. 11, 1998

[51] Int. Cl.⁶ ........................................ H02J 7/00
[52] U.S. Cl. ............................ 320/114; 320/112
[58] Field of Search .................... 320/111, 112, 320/113, 114, 107

[56] References Cited

U.S. PATENT DOCUMENTS 4,709,202  11/1987  Koenck et al. ................. 320/113
4,998,055  3/1991  Nash et al. ..................... 320/113

Primary Examiner—Peter S. Wong
Assistant Examiner—Gregory J. Toatleyne
Attorney, Agent, or Firm—Frank M. Scutch, III

[57] ABSTRACT

A battery pack (100) for an electronic device includes one or more rechargeable battery cells (102), a charging circuit (117) for regulating a predetermined recharging voltage and current applied to the battery cells (102); and an electrical connector (115) integrated into the battery pack for providing connection to the charging circuit and permitting connection to the electrical connector (115) whether the battery pack (100) is positioned within or outside the electronic device.

14 Claims, 3 Drawing Sheets

BATTERY PACK HAVING INTEGRATED CHARGING CIRCUIT AND CHARGING CONNECTOR AND METHOD OF FORMING SAME

TECHNICAL FIELD

This invention relates in general to batteries and more particularly to a rechargeable battery assembly.

BACKGROUND

Removable power cells or battery packs are often used to power many types portable electronic devices. These cells are often rechargeable and arranged into a shape to fit a particular form factor. In order to offer many of these electronic devices at a low cost, a battery pack often is comprised of non-rechargeable alkaline cells. When the capacity of the battery cells becomes spent or expended, the battery pack can be discarded or the individual cells replaced in order to provide the device with sufficient operating voltage. Moreover, some electronic devices include rechargeable cells, the battery pack containing these cells must be physically removed from the electronic device in order to be recharged or the device placed into a specially designed "cradle" charger where there recharging terminals can be accessed.

Thus, the need exists for a battery pack that is capable of being easily recharged in or out of the electronic device and does not require a cradle charger or other specialized charging system to hold the battery while being recharged.

DETAILED DESCRIPTION OF THE PREFERRED EMBODIMENT

Figure 1:
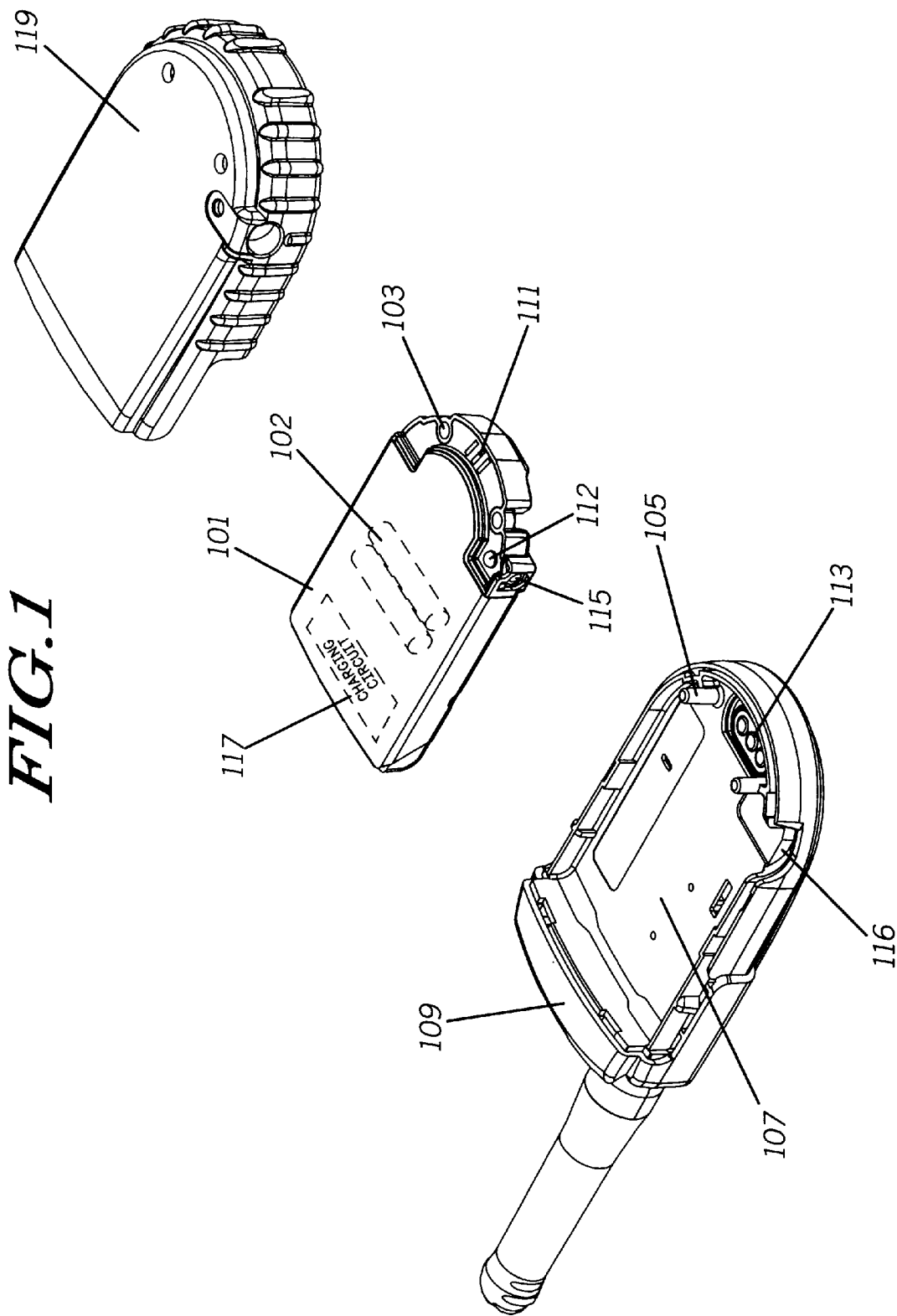
FIG. 1 is an exploded isometric view of the battery pack with integrated charging circuit and charging connector according to the preferred embodiment of the invention.
Figure 2:
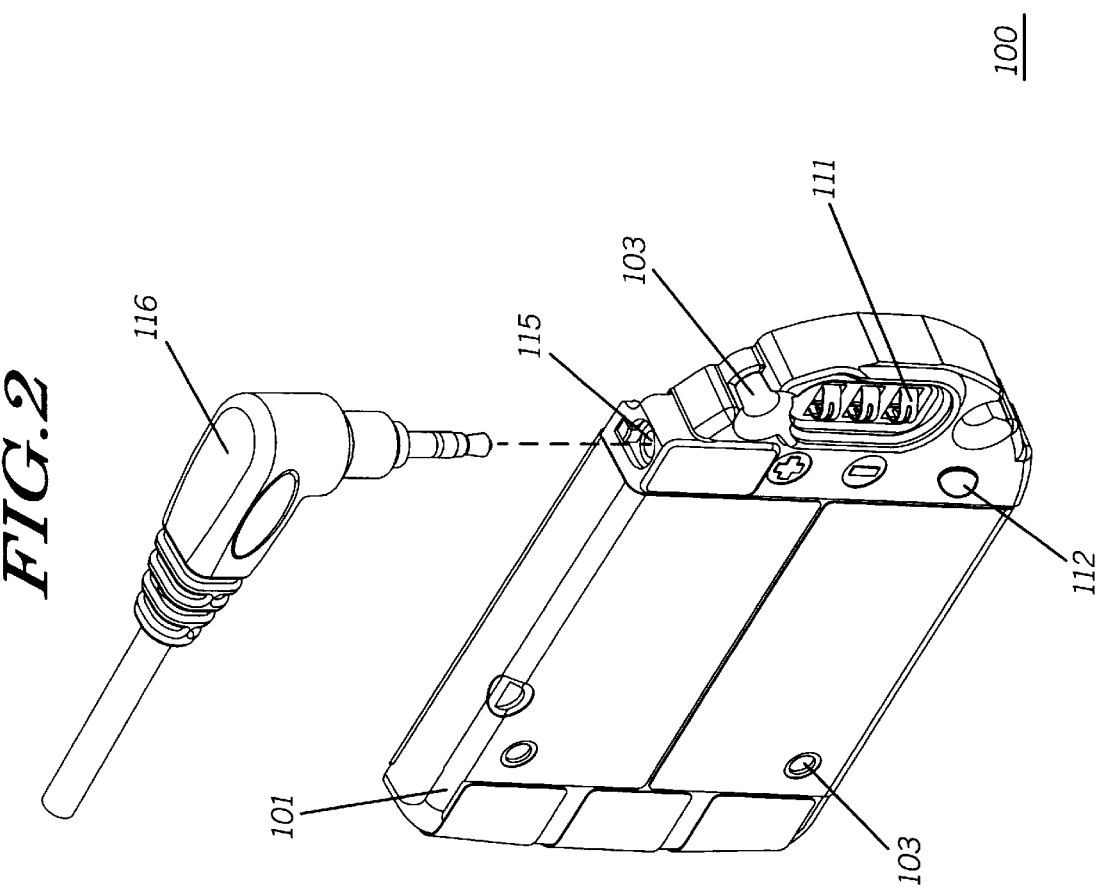
FIG. 2 is a detailed isometric view of the battery pack as shown in FIG. 1.

Referring now to both FIG. 1 and FIG. 2, the battery pack having an integrated charging circuit and charging connector 100 includes a battery housing 101 for holding one or more rechargeable battery cells 102. As is well known in the art, these battery cells can be various shapes and/or sizes and maybe be nickel cadmium, nickel metal hydride or lithium ion chemistries.

The housing further includes one or more alignment apertures 103 that work to position and/or align with corresponding alignment posts 105 that protrude from within a battery tray 107. The battery tray 107 is located in the rear portion of a radio housing 109 and is sized to accommodate the shape and thickness of the battery housing 101. Thus, the battery pack 100 fits into the battery tray 107 and the alignment post 105 works to secure the battery pack 100 into a fixed position as well as to align the battery housing 101 to insure alignment of electrical contracts on the pack and the radio housing 109. Finally, a cover 119 is used to cover and protect the battery housing 101 when in use.

At the top edge of the battery housing 101, a plurality of battery contacts 111 are used to interface with corresponding radio electrical contacts 113 located in the battery tray 107.

The battery pack 100 further includes an integrated electrical connector 115 that is attached to a battery charging circuit 117. The battery charging circuit 117 connects to the rechargeable battery cells(s) and may operate in several ways. In one embodiment, the battery charging circuit 117 includes a diode or polyswitch for insuring correct battery polarity and/or a thermistor for preventing the battery from heating above a predetermined temperature during charging. As evident to those skilled in the art, in this embodiment, an external direct current (DC) voltage source (not shown) is used to supply a regulated voltage and current to the battery charging circuit 117 through the electrical connector 115 for recharging. In an alternative embodiment, the voltage and current regulation circuit may be provided with the polyswitch and/or thermistor circuits for on-board control of the recharging voltage and current. Finally, a charging status indicator 112 such as a light emitting diode (LED) or other light indicator is included on the housing 101 for indicating to the user that the battery pack 100 is in a recharge mode and receiving a voltage from the external source.

As will be evident to those skilled in the art, having the electrical connector 115 and the charging circuit integrated into a single package offers a number of advantages, namely, the battery pack 100 can be charged either within the battery tray 107 or outside the battery tray as a stand alone unit. No special charger assembly such as a customized cradle charger or the like is required. The external charging source (not shown) can be connected to connector 115 directly or indirectly though an access slot or port 116 in the battery tray 107. Thus, the battery pack 100 is very versatile capable of being recharged in or out of the electronic device.

Figure 3:
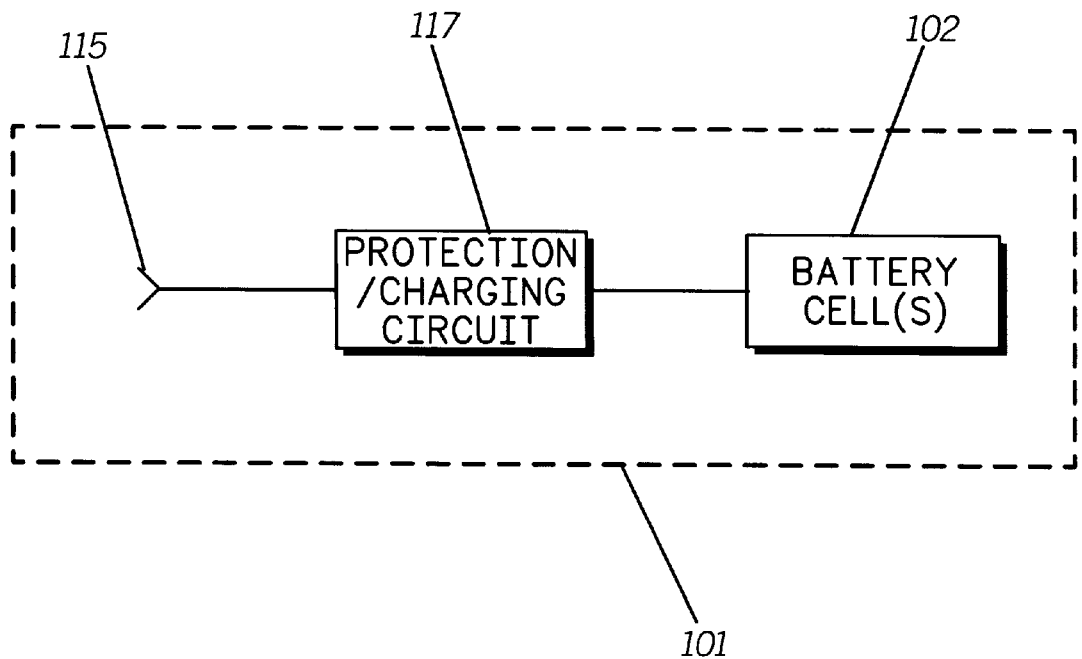
FIG. 3 is a block diagram showing the connection of the battery pack integrated connector, battery charging circuit and battery cells.

Finally in FIG. 3, a block diagram is shown illustrating the electrical connection of the electrical connector 115, the battery protection/charging circuit 117 and battery cell(s) 102.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery pack for an electronic device comprising:
    at least one battery cell; and
    an electrical connector integrated into the battery pack for providing connection to the at least one battery cell whether the battery pack is positioned within or outside the electronic device.

2. A battery pack as in claim 1, further comprising:
    a plurality of alignment apertures located within the battery pack for aligning with at least one alignment post located on the electronic device.

3. A battery pack as in claim 1, further comprising a charging status indictor for indicating the at least one battery cell is in a recharge mode.

4. A battery pack as in claim 1, further comprising:
    a battery protection circuit for preventing damage to the at least one battery cell due to incorrect polarity and high battery temperature outside a predetermined temperature range.

5. A battery pack as in claim 4, wherein the battery protection circuit further comprises an electrical circuit for providing a regulated voltage and current during a recharge mode.

6. A rechargeable battery pack used within an electronic device having an integrated charging circuit and electrical connector comprising:

at least one rechargeable battery cell positionable within an battery tray located in the electronic device;

a control circuit located within the battery pack for preventing over temperature of the rechargeable battery cell during a recharge mode; and an electrical recharging connector integrated within the rechargeable battery pack enabling connection of the external power source irrespective of the rechargeable battery pack's position within or outside the battery tray.

7. A rechargeable battery pack as in claim 6, further comprising:

at least one alignment aperture located within the rechargeable battery pack for aligning the battery pack in a predetermined orientation with a corresponding alignment post within the battery tray.

8. A rechargeable battery pack as in claim 6, wherein the battery tray includes an access slot for accessing the electrical connector when the rechargeable battery pack is inserted within the battery tray.

9. A rechargeable battery pack as in claim 6, wherein the control circuit further includes an electrical circuit for providing a predetermined current and voltage to the at least one rechargeable battery cell from an external power source when in a recharge mode.

10. A method for providing a rechargeable battery pack capable of being recharged inside or outside of a battery tray located within an electronic device comprising the steps of:

providing at least one battery cell within a recharge battery pack housing; and attaching an electrical connector with the recharge battery pack housing for enabling the battery pack to be recharged within or outside of the battery tray.

11. A method for providing a rechargeable battery pack as in claim 10, further comprising the step of:

connecting a battery control circuit within the battery pack housing for providing a predetermined voltage and current to the battery during charging.

12. A method for providing a rechargeable battery pack as in claim 10, further comprising the step of:

connecting a battery control circuit within battery pack housing for providing control of battery temperature while in a recharging mode.

13. A method for providing a rechargeable battery pack as in claim 10, further comprising the step of:

aligning a plurality of alignment apertures in the rechargeable battery pack with corresponding alignment posts in the battery tray for securing the rechargeable battery pack within the battery tray.

14. A method for providing a rechargeable battery pack as in claim 10, further comprising the step of:

providing a charging status indicator for indicating the at least one battery cell is in the recharging mode.

* * * * *